(12) United States Patent
Okuwaki et al.

(10) Patent No.: US 9,440,526 B2
(45) Date of Patent: Sep. 13, 2016

(54) DRIVE SYSTEM FOR HYBRID VEHICLE (71) Applicant: TOYOTA JIDOSHA KABUSHIKI KAISHA, Toyota-shi, Aichi-ken (JP)

(72) Inventors: Shigeru Okuwaki, Gotemba (JP); Hiroyuki Shioiri, Numazu (JP); Hiroyuki Shibata, Odawara (JP); Kouhei Miyake, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/890,533

(22) PCT Filed: May 13, 2013

(86) PCT No.: PCT/JP2013/063322
§ 371 (c)(1),
(2) Date: Nov. 11, 2015

(87) PCT Pub. No.: WO2014/184854
PCT Pub. Date: Nov. 20, 2014

(65) Prior Publication Data
US 2016/0107518 A1 Apr. 21, 2016

(51) Int. Cl.
*B60L 9/00* (2006.01)
*B60K 6/365* (2007.10)
*B60K 6/40* (2007.10)
*B60K 6/445* (2007.10)
(Continued)

(52) U.S. Cl.
CPC ............... *B60K 6/365* (2013.01); *B60K 6/387* (2013.01); *B60K 6/40* (2013.01); *B60K 6/445* (2013.01); *B60K 6/48* (2013.01); *B60W 20/10* (2013.01); *F16H 48/06* (2013.01); *F16H 48/30* (2013.01); *B60K 2006/381* (2013.01); *B60Y 2200/92* (2013.01); *B60Y 2300/182* (2013.01); *B60Y 2300/84* (2013.01); *F16H 2048/204* (2013.01); *Y02T 10/6239* (2013.01); *Y10S 903/945* (2013.01)

(58) Field of Classification Search
USPC .......................................................... 701/22
See application file for complete search history.

(56) References Cited

U.S. PATENT DOCUMENTS 4,768,399 A * 9/1988 Kubo ................. B60K 23/0808
180/249
8,065,065 B2 * 11/2011 Satou .................... F16H 61/143
701/51

(Continued)

FOREIGN PATENT DOCUMENTS

JP 2004-345527 A 12/2004
JP 2005264762 A 9/2005

(Continued)

Primary Examiner — Hussein A. ElChanti
(74) Attorney, Agent, or Firm — Kenyon & Kenyon LLP (57) ABSTRACT

A drive system includes: a power split mechanism including a planetary gear unit, in which a ring gear is connected to an internal combustion engine, a sun gear is connected to a motor, and a carrier is connected to a counter shaft in a manner capable of transmitting power; a lock mechanism that can lock the sun gear; and a clutch mechanism that can engage the sun gear and the ring gear. The internal combustion engine, the power split mechanism, the motor, the lock mechanism, and the clutch mechanism are arranged on the same axis. The lock mechanism and the clutch mechanism are arranged on an opposite side of the internal combustion engine with the power split mechanism and the motor being interposed therebetween.

5 Claims, 6 Drawing Sheets (51) Int. Cl.
*B60K 6/387* (2007.10)
*B60K 6/48* (2007.10)
*B60W 20/00* (2016.01)
*F16H 48/06* (2006.01)
*F16H 48/30* (2012.01)
*B60K 6/38* (2007.10)
*F16H 48/20* (2012.01)

(56) References Cited

U.S. PATENT DOCUMENTS

| | | | | |
|---|---|---|---|---|
| 9,162,569 | B2* | 10/2015 | Dean | B60K 23/04 |
| 2006/0124374 | A1* | 6/2006 | Katada | B60K 6/52 |
| | | | | 180/233 |
| 2009/0221392 | A1* | 9/2009 | Bruce | B60K 17/3462 |
| | | | | 475/205 |
| 2010/0301825 | A1* | 12/2010 | Yamaguchi | H02M 3/1588 |
| | | | | 323/284 |
| 2011/0256974 | A1 | 10/2011 | Okuwaki | |
| 2012/0111691 | A1* | 5/2012 | Leiter | B60T 10/02 |
| | | | | 192/221 |
| 2013/0245909 | A1* | 9/2013 | Hirose | B60T 8/17551 |
| | | | | 701/73 |
| 2014/0213412 | A1* | 7/2014 | Marsh | F16H 48/30 |
| | | | | 477/35 |

FOREIGN PATENT DOCUMENTS

| | | |
|---|---|---|
| WO | 2011/128998 A1 | 10/2011 |
| WO | 2012/131218 A1 | 10/2012 |
| WO | 2014/184852 A1 | 11/2014 |
| WO | 2014/184853 A1 | 11/2014 |

* cited by examiner

DRIVE SYSTEM FOR HYBRID VEHICLE

CROSS-REFERENCE TO RELATED APPLICATION

This is a national phase application based on the PCT International Patent Application No. PCT/JP2013/063322 filed May 13, 2013, the entire contents of which are incorporated herein by reference.

TECHNICAL FIELD

The invention relates to a drive system for a hybrid vehicle including: a power split mechanism that includes a differential mechanism and in which an internal combustion engine and a motor generator are coupled; and a lock mechanism that can unrotatably lock a rotation element of the differential mechanism.

BACKGROUND ART

A hybrid vehicle, in which an internal combustion engine, a motor generator, and an output shaft are connected to different rotation elements of a planetary gear unit and a ratio between a speed of the internal combustion engine and a rotational speed of the output shaft, that is, a transmission gear ratio is continuously varied by the planetary gear unit and the motor generator, has been known. As a drive system for such a hybrid vehicle, a system that includes two planetary gear units and a brake and realizes a continuously variable state, in which a transmission gear ratio is continuously varied by these components, and an overdrive state, in which a speed of an internal combustion engine is lower than a rotational speed of an output shaft, has been known (see Patent Literature 1). Other than the above, Patent Literature 2 is available as related art literature that is related to the invention.

RELATED ART LITERATURE

Patent Literature

Patent Literature 1: Japanese Patent Application Publication No. 2004-345527 (JP 2004-345527 A)
Patent Literature 2: International Publication No. 2012/131218

SUMMARY OF THE INVENTION

Problem to be Solved by the Invention

In the system of Patent Literature 1, the transmission gear ratio of the drive system can be fixed to a transmission gear ratio that differs from a transmission gear ratio in the overdrive state by providing a brake or a clutch other than the already-provided brake and limiting the rotation of the rotation elements provided in the planetary gear unit by the brake or the clutch. Accordingly, three drive modes can be realized. However, in the system of Patent Literature 1, the brake or the clutch has to be arranged between two motor generators. For this reason, an outer diameter of the brake or the clutch becomes large, which possibly results in an increase in size of the system.

In view of the above, the invention has a purpose of providing a drive system for a hybrid vehicle that can realize three drive modes and is advantageous in terms of size reduction.

Means for Solving the Problem

A drive system of the invention includes: an internal combustion engine; a first motor generator; a power split mechanism that includes a differential mechanism having plural rotation elements capable of making mutually differential rotation and to which the internal combustion engine and the first motor generator are coupled; an output member to which power output from the power split mechanism is transmitted; and a second motor generator that can output the power to the output member. The drive system for a hybrid vehicle further includes: a lock mechanism that can be switched between a locking state in which a rotation element coupled to the first motor generator among the plural rotation elements is unrotatably locked and a releasing state in which rotation of the rotation element is permitted; and rotation limit means that can be switched between a limiting state in which rotation of a rotation element other than the rotation element coupled to the first motor generator among the plural rotation elements is limited and a releasing state in which limit on rotation of the rotation element is cancelled. The internal combustion engine, the first motor generator, the power split mechanism, the lock mechanism, and the rotation limit means are arranged on the same axis. The power split mechanism is arranged between the internal combustion engine and the first motor generator. The lock mechanism and the rotation limit means are arranged on an opposite side of the internal combustion engine with the power split mechanism and the first motor generator being interposed therebetween.

The drive system of the invention can realize three drive modes that are: a drive mode in which the lock mechanism is in the locking state and the rotation limit means is in the releasing state; a drive mode in which the lock mechanism is in the releasing state and the rotation limit means is in the limiting state; and a drive mode in which both of the lock mechanism and the rotation limit means are in the releasing states. In addition, since the lock mechanism and the rotation limit means are arranged on the opposite side of the internal combustion engine with the power split mechanism and the first motor generator being interposed therebetween, size increase of these lock mechanism and the rotation limit means can be suppressed. Thus, the drive system can be downsized. In addition, mountability thereof in the vehicle can thereby be improved.

In one aspect of the drive system of the invention, the power split mechanism may include a planetary gear unit of a single pinion type as the differential mechanism, the plural rotation elements may be a sun gear, a ring gear, and a carrier of the planetary gear unit, the internal combustion engine may be coupled to the ring gear, the first motor generator may be coupled to the sun gear, the output member may be connected to the carrier in a manner capable of transmitting the power, and the rotation limit means may couple the sun gear and the ring gear in a manner to allow integral rotation thereof in the limiting state and cancel coupling of the sun gear and the ring gear in the releasing state. In this aspect, when the lock mechanism is in the releasing state and the rotation limit means is in the limiting state, the sun gear, the ring gear, and the carrier rotate integrally. Thus, a drive mode in which a transmission gear ratio of the power split mechanism is set to 1 can be realized. Meanwhile, when the lock mechanism is in the locking state and the rotation limit means is in the releasing state, a drive mode in which a speed of the internal combustion engine is lowered by the power split mechanism and is output to the output member can be realized. In addition, when both of the lock mechanism and the rotation limit means are in the releasing state, a drive mode in which the transmission gear ratio of the drive system is continuously changed by changing a rotational speed of the first motor generator can be realized.

In one aspect of the drive system of the invention, the power split mechanism may include a first planetary gear unit and a second planetary gear unit of a single pinion type as the differential mechanism, the plural rotation elements may be a sun gear, a ring gear, and a carrier of the first planetary gear unit and may also be a sun gear, a ring gear, and a carrier of the second planetary gear unit, the internal combustion engine may be coupled to the carrier of the first planetary gear unit and the carrier of second planetary gear unit, the first motor generator may be coupled to the sun gear of the first planetary gear unit, the ring gear of the first planetary gear unit may be connected to the output member in a manner capable of transmitting the power via a gear line of a first gear ratio, the ring gear of the second planetary gear unit may be connected to the output member in a manner capable of transmitting the power via a gear line of a second gear ratio that is smaller than the first gear ratio, and the rotation limit means may unrotatably lock the sun gear of the second planetary gear unit in the limiting state and permit rotation of the sun gear of the second planetary gear unit in the releasing state. In this aspect, when the lock mechanism is in the locking state and the rotation limit means is in the releasing state, the sun gear of the second planetary gear unit rotates idle. Thus, a drive mode in which rotation of the internal combustion engine is transmitted to the output member via the first planetary gear unit can be realized. Meanwhile, when the lock mechanism is in the releasing state, the rotation limit means is in the limiting state, and torque of the first motor generator is set to zero, the sun gear of the first planetary gear unit rotates idle. Thus, a drive mode in which the rotation of the internal combustion engine is transmitted to the output member via the second planetary gear unit can be realized. Since the second gear ratio is smaller than the first gear ratio, two drive modes in which ratios between the speed of the internal combustion engine and a rotational speed of the output member differ can be realized. In addition, when both of the lock mechanism and the rotation limit means are in the releasing state, a drive mode in which the transmission gear ratio of the drive system is continuously changed by changing the rotational speed of the first motor generator can be realized.

In one aspect of the drive system of the invention, the second motor generator may be arranged on an axis that differs from an axis on which the lock mechanism and the rotation limit means are arranged. Just as described, by arranging the second motor generator on the different axis, a length of the drive system in an axial direction can be reduced. Thus, the system can further be downsized.

One aspect of the drive system of the invention may further includes: a battery to which the first motor generator and the second motor generator are electrically connected; and control means for switching the lock mechanism to the locking state, switching the rotation limit means to the releasing state, and making the second motor generator generate electric power such that an operation point of the internal combustion engine is moved to a specified operation line defined such that thermal efficiency of the internal combustion engine is the maximum in the case where a specified mode switching condition is established and a state of charge of the battery is a specified determination value or lower, and for switching the lock mechanism to the releasing state, switching the rotation limit means to the limiting state, and making the second motor generator output torque such that the operation point of the internal combustion engine is moved to the specified operation line defined such that the thermal efficiency of the internal combustion engine is the maximum in the case where the mode switching condition is established and the state of charge of the battery is higher than the determination value. According to this aspect, the internal combustion engine can be operated in a state of the high thermal efficiency in both of the drive modes that are the drive mode in which the lock mechanism is in the locking state and the drive mode in which the rotation limit means is in the limiting state. Thus, fuel economy can be improved. In addition, in these drive modes, a reactive force for transmitting the rotation of the internal combustion engine to the output member does not have to be output from the first motor generator. Thus, energy consumed by the first motor generator can be reduced. Therefore, energy efficiency of the drive system can be improved.

MODES FOR CARRYING OUT THE INVENTION

First Embodiment

Figure 1:
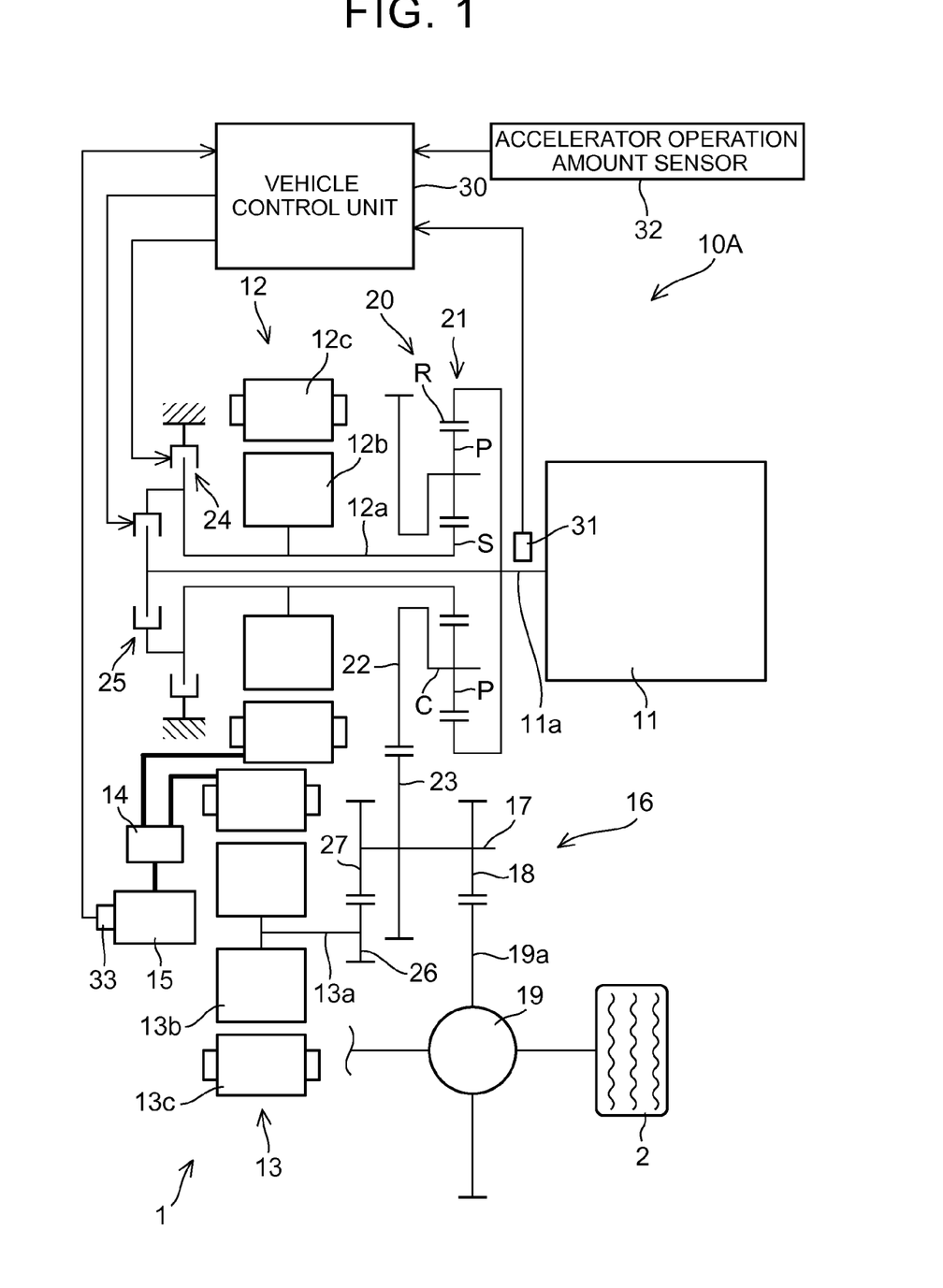
FIG. 1 schematically shows a drive system according to a first embodiment of the invention.

FIG. 1 is a skeletal view of a drive system according to a first embodiment of the invention. This drive system 10A is mounted in a hybrid vehicle 1, and includes an internal combustion engine (hereinafter may be referred to as an engine) 11, a first motor generator (hereinafter may be abbreviated as a first MG) 12, and a second motor generator (hereinafter may be abbreviated as a second MG) 13. The engine 11 is a well-known spark-ignition-type internal combustion engine that is mounted in the hybrid vehicle. Thus, a detailed description thereon will not be made.

The first MG 12 and the second MG 13 are each a well-known motor generator that functions as an electric motor and a generator. The first MG 12 includes: a rotor 12b that integrally rotates with a rotor shaft 12a; and a stator 12c that is coaxially arranged on an outer circumference of the rotor 12b and is fixed to a case (not shown). Similarly, the second MG 13 also includes: a rotor 13b that integrally rotates with a rotor shaft 13a; and a stator 13c that is coaxially arranged on an outer circumference of the rotor 13b and is fixed to a case. Each of the MGs 12, 13 is connected to a battery 15 via a motor control unit 14. The motor control unit 14 converts electric power that is generated by each of the MGs 12, 13 into DC power to be stored in the battery 15, and also converts the electric power of the battery 15 into AC power to be supplied to each of the MGs 12, 13.

An output shaft 11a of the engine 11 and the rotor shaft 12a of the first MG 12 are connected to a power split mechanism 20. An output section 16 for outputting the power to drive wheels 2 of the vehicle 1 is also connected to the power split mechanism 20. The output section 16 includes: a counter shaft 17 as an output member; and an output gear 18 that integrally rotates with the counter shaft 17. The output gear 18 meshes with a ring gear 19a that is provided on a case of a differential mechanism 19. The differential mechanism 19 is a well-known mechanism that distributes the power transmitted to the ring gear 19a to the right and left drive wheels 2.

The power split mechanism 20 includes a planetary gear unit 21 of a single pinion type. The planetary gear unit 21 includes: a sun gear S as an outer gear; a ring gear R as an inner gear that is coaxially arranged with respect to the sun gear S; and a carrier C for retaining a pinion gear P that meshes with these gears S, R in a manner to allow rotation thereof and revolution thereof about the sun gear S. As shown in this drawing, the sun gear S is coupled so as to integrally rotate with the rotor shaft 12a of the first MG 12. The ring gear R is coupled so as to integrally rotate with the output shaft 11a of the engine 11. The carrier C is coupled so as to integrally rotate with a first drive gear 22. This first drive gear 22 meshes with a first driven gear 23 that is provided on the counter shaft 17.

As shown in this drawing, the sun gear S is provided with a lock mechanism 24. The lock mechanism 24 can be switched between a locking state in which the sun gear S and the rotor shaft 12a are unrotatably locked and a releasing state in which rotation of the sun gear S and the rotor shaft 12a is permitted. In addition, the sun gear S is connected to the ring gear R via a clutch mechanism 25. The clutch mechanism 25 can be switched between an engaging state in which the sun gear S and the ring gear R are coupled and a releasing state in which coupling between the sun gear S and the ring gear R is cancelled.

As shown in this drawing, the engine 11, the power split mechanism 20, the first MG 12, the lock mechanism 24, and the clutch mechanism 25 are arranged on the same axis. In addition, the power split mechanism 20 is arranged between the engine 11 and the first MG 12. The lock mechanism 24 and the clutch mechanism 25 are arranged on an opposite side of the engine 11 with the power split mechanism 20 and the first MG 12 being interposed therebetween. Just as described, the lock mechanism 24 and the clutch mechanism 25 are collectively arranged on one end.

The rotor shaft 13a of the second MG 13 is provided with a second drive gear 26. This second drive gear 26 meshes with a second driven gear 27 that is provided on the counter shaft 17. As shown in this drawing, the second MG 13 is arranged on an axis that differs from the axis on which the lock mechanism 24 and the clutch mechanism 25 are arranged.

In this drive system 10A, a drive mode can be switched among a low gear mode, a high gear mode, and a continuously variable mode by switching a state of each of the lock mechanism 24 and the clutch mechanism 25. In the low gear mode, the lock mechanism 24 is switched to the locking state, and the clutch mechanism 25 is switched to the releasing state. In the high gear mode, the lock mechanism 24 is switched to the releasing state, and the clutch mechanism 25 is switched to the engaging state. In the continuously variable mode, both of the lock mechanism 24 and the clutch mechanism 25 are switched to the releasing state.

Figure 2:
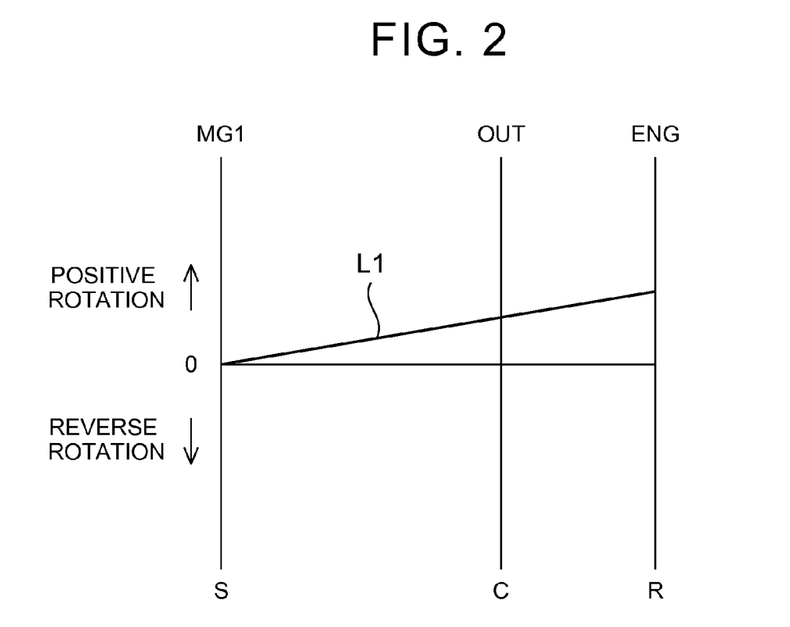
FIG. 2 shows one example of a collinear diagram of the drive system in a low gear mode.
Figure 3:
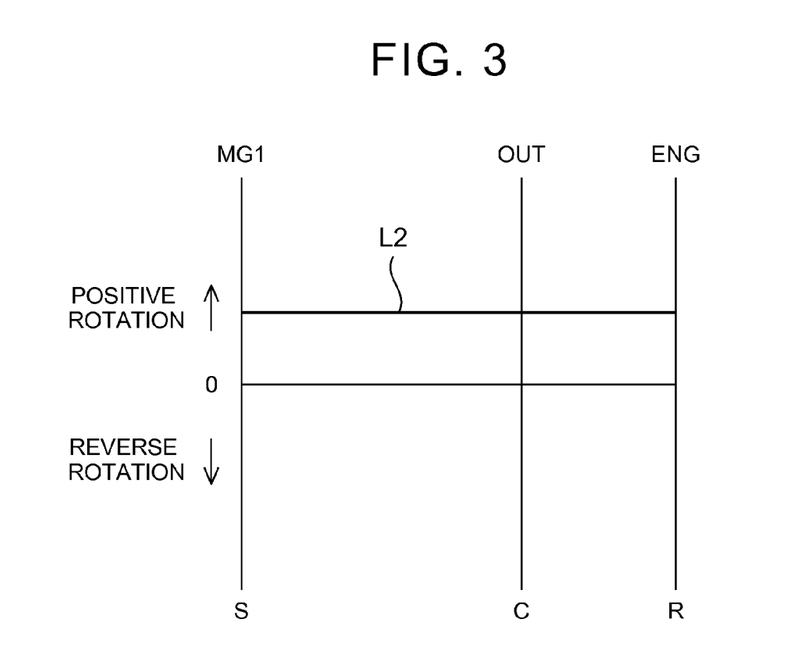
FIG. 3 shows one example of a collinear diagram of the drive system in a high gear mode.

FIG. 2 shows one example of a collinear diagram of the drive system 10A in the low gear mode. FIG. 3 shows one example of a collinear diagram of the drive system 10A in the high gear mode. It should be noted that, in the diagrams, "ENG" indicates the engine 11 and "OUT" indicates the first drive gear 22. In addition, "MG1" indicates the first MG 12. "S" indicates the sun gear S, "R" indicates the ring gear R, and "C" indicates the carrier C.

In the low gear mode, the lock mechanism 24 is switched to the locking state. Thus, the sun gear S is unrotatably locked. Meanwhile, since the clutch mechanism 25 is switched to the releasing state, the rotation of the ring gear R is permitted. Thus, as indicated by a solid line L1 in FIG. 2, a rotational speed of the first MG 12 is fixed to zero, and a rotational speed of the first drive gear 22 becomes lower than a speed of the engine 11.

On the other hand, in the high gear mode, the clutch mechanism 25 is switched to the engaging state. Thus, the sun gear S and the ring gear R are coupled. In addition, since the lock mechanism 24 is switched to the releasing state, the rotation of the sun gear S and the rotation of the ring gear R are permitted. In this case, as indicated by a solid line L2 in FIG. 3, the sun gear S, the ring gear R, and the carrier C rotate integrally. Accordingly, the rotational speed of the first drive gear 22 and the speed of the engine 11 become the same. Thus, in the high gear mode, a transmission gear ratio of the drive system 10A becomes low in comparison with that in the low gear mode. That is, the high gear is set.

In the continuously variable mode, both of the lock mechanism 24 and the clutch mechanism 25 are switched to the releasing state. Thus, the rotation of the sun gear S, that of the ring gear R, and that of the carrier C are permitted. In this case, a ratio between the speed of the engine 11 and the rotational speed of the first drive gear 22 can continuously be changed by changing the rotational speed of the first MG 12.

The lock mechanism 24 and the clutch mechanism 25 are controlled by a vehicle control unit 30. The vehicle control unit 30 is constituted as a computer unit including a microprocessor and peripheral equipment, such as a RAM and a ROM, that are required for an operation thereof. The vehicle control unit 30 retains various control programs for making the vehicle 1 run appropriately. The vehicle control unit 30 executes control of control targets, such as the engine 11 and each of the MGs 12, 13, by executing these programs. Various sensors for obtaining information related to the vehicle 1 are connected to the vehicle control unit 30. For example, a crank angle sensor 31, an accelerator operation amount sensor 32, and an SOC sensor 33 are connected to the vehicle control unit 30. The crank angle sensor 31 outputs a signal that corresponds to a rotational speed of the output shaft 11a of the engine 11. The accelerator operation amount sensor 32 outputs a signal that corresponds to a depression amount of an accelerator pedal, that is, an accelerator operation amount. The SOC sensor 33 outputs a signal that corresponds to a state of charge (SOC) of the battery 15. Although various sensors, switches, and the like other than the above are connected to the vehicle control unit 30, those are not shown.

Figure 4:
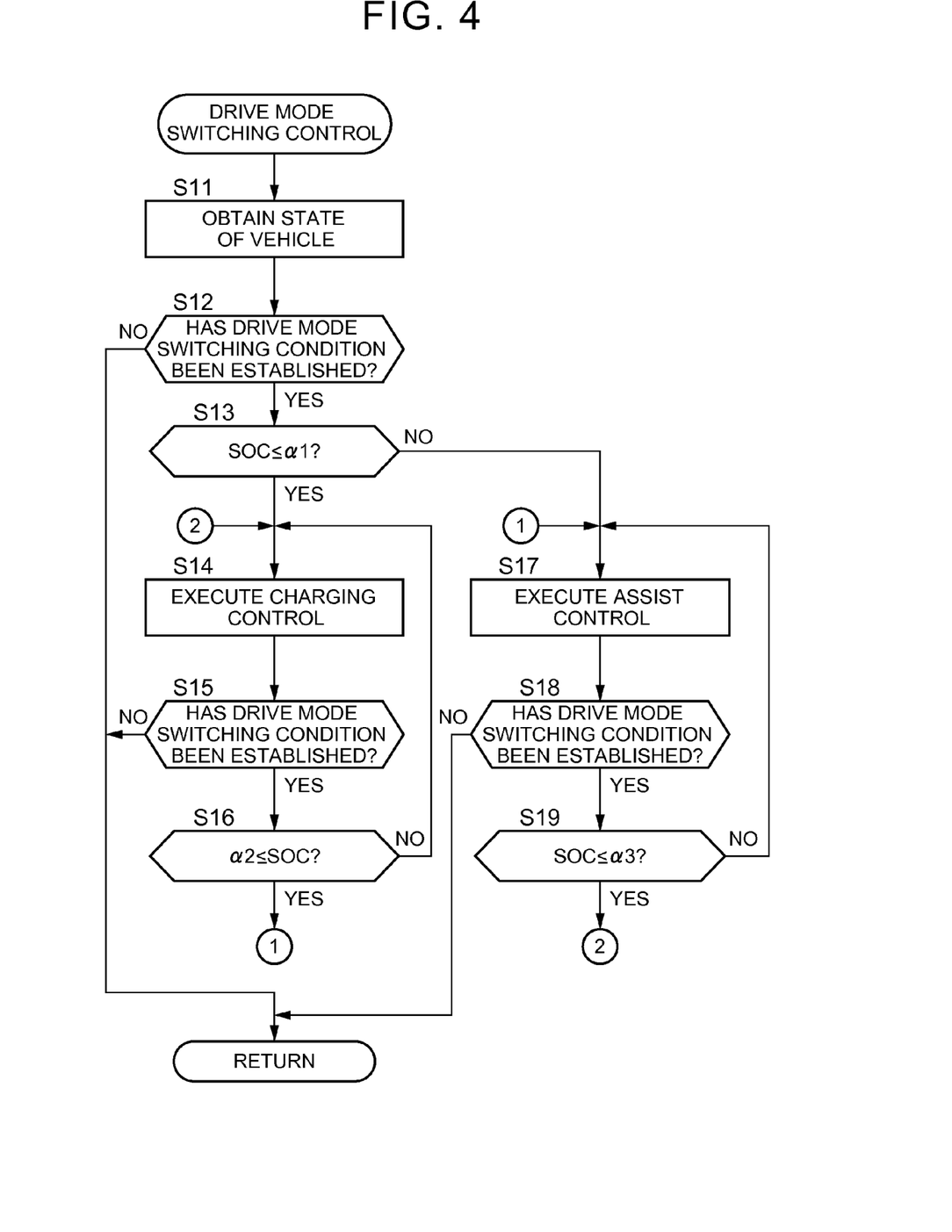
FIG. 4 is a flowchart of a drive mode switching control routine that is executed by a vehicle control unit.

FIG. 4 shows a drive mode switching control routine that is executed by the vehicle control unit 30 in order to control the lock mechanism 24, the clutch mechanism 25, and the second MG 13. In this control routine, the lock mechanism 24, the clutch mechanism 25, and the second MG 13 are controlled such that the power requested by a driver can be output from the drive system 10A and that the engine 11 can be operated in a state of high thermal efficiency.

Figure 5:
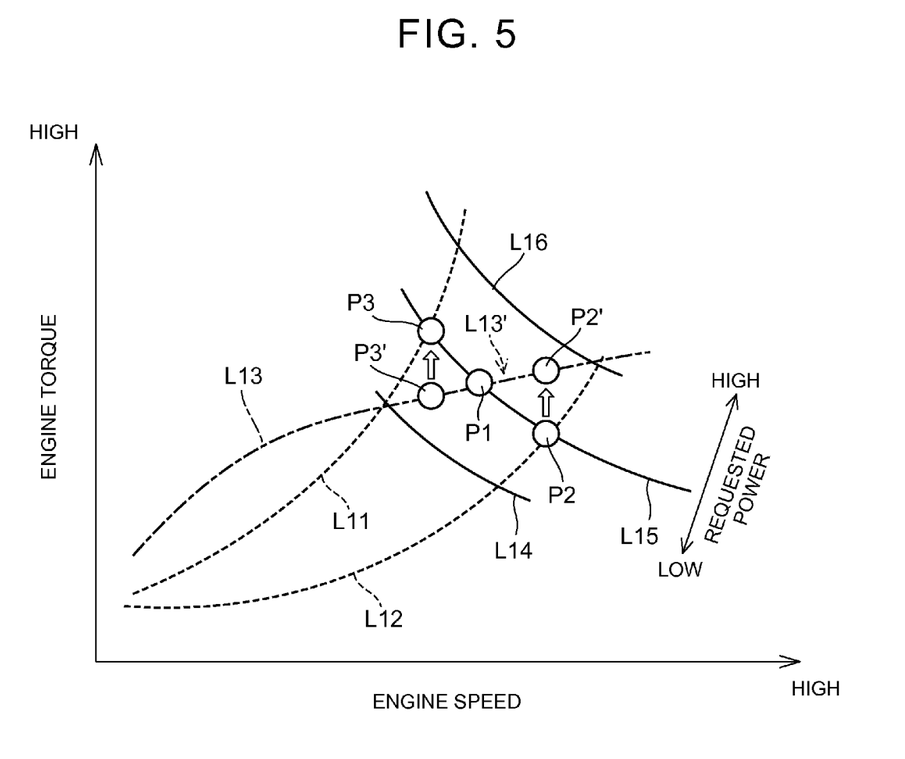
FIG. 5 is a chart for explaining outlines of charging control and assist control.

Before the control routine in FIG. 4 is explained, an overview of this control method will be described with reference to FIG. 5. A broken line L11 in FIG. 5 indicates that the drive mode is the high gear mode, and also indicates drive power that is requested to the engine 11 when the vehicle 1 runs only by using the engine 11. A broken line L12 indicates that the drive mode is the low gear mode, and also indicates the drive power that is requested to the engine 11 when the vehicle 1 runs only by using the engine 11. A chain dot line L13 indicates an operation line of the engine 11 that is defined such that the thermal efficiency of the engine 11 is the maximum. Hereinafter, this operation line may be referred to as an optimal efficiency line. Each of solid lines L14 to L16 indicates a power line that is made by connecting operation points at which the output power of the engine 11 is the same.

In this control, the drive mode is switched to the high gear mode or to the low gear mode when the vehicle 1 runs only by using the engine 11, the drive mode is the continuously variable mode, and the operation point of the engine 11 is located in a section L13' of the optimal efficiency line L13 between the broken line L11 and the broken line L12. For example, when the operation point of the engine 11 is a point P1 in the chart, the drive mode is switched. At this time, if the SOC of the battery 15 is a preset specified first determination value $\alpha 1$ or lower, the drive mode is switched to the low gear mode. As a result, the operation point of the engine 11 is shifted to a point P2, and thus the thermal efficiency of the engine 11 is lowered. Accordingly, in this case, in order to maintain a speed of the vehicle 1 and to increase the thermal efficiency of the engine 11, the electric power is generated in the second MG 13. More specifically, the electric power is generated in the second MG 13 such that the operation point of the engine 11 is shifted from the point P2 to a point P2'. Hereinafter, this control may be referred to as charging control.

On the other hand, if the SOC of the battery 15 is higher than the first determination value $\alpha 1$, the drive mode is switched to the high gear mode. In this case, the operation point of the engine 11 is shifted to a point P3, and thus the thermal efficiency of the engine 11 is lowered. Accordingly, in this case, in order to increase the thermal efficiency of the engine 11 while maintaining the speed of the vehicle 1, torque is output from the second MG 13. More specifically, the torque is output from the second MG 13 to assist driving of the vehicle 1 such that the operation point of the engine 11 is shifted from the point P3 to a point P3'. Hereinafter, this control may be referred to as assist control.

The control routine in FIG. 4 will be described. This control routine is repeatedly executed at specified intervals during running of the vehicle 1. In addition, this control routine is executed in parallel with another routine executed by the vehicle control unit 30.

In this control routine, the vehicle control unit 30 first obtains a state of the vehicle 1 in step S11. As the state of the vehicle 1, for example, the speed of the engine 11, the torque requested to the vehicle 1, and the state of charge of the battery 15 are obtained. It should be noted that the torque requested to the vehicle 1 may be computed from the accelerator operation amount by using a well-known method. In next step S12, the vehicle control unit 30 determines whether a drive mode switching condition has been established. It is determined that the drive mode switching condition has been established when the vehicle 1 is running only by using the engine 11, the drive mode is the continuously variable mode, and the operation point of the engine 11 is located in the section L13' of the optimal efficiency line L13. It should be noted that this determination may be made on the basis of the relationship shown in FIG. 5. The relationship in FIG. 5 may be computed in advance by an experiment, a numerical calculation, or the like and be stored as a map in the ROM of the vehicle control unit 30. If it is determined that the drive mode switching condition has not been established, the current control routine is terminated.

On the other hand, if it is determined that the drive mode switching condition has been established, the process proceeds to step S13, and it is determined whether the SOC of the battery 15 is the first determination value $\alpha 1$ or lower. If it is determined that the state of charge of the battery 15 is the first determination value $\alpha 1$ or lower, the process proceeds to step S14, and the vehicle control unit 30 executes the above-described charging control. In next step S15, the vehicle control unit 30 determines whether the drive mode switching condition has been established. If it is determined that the drive mode switching condition has not been established, the current control routine is terminated.

On the other hand, if it is determined that the drive mode switching condition has been established, the process proceeds to step S16, and the vehicle control unit 30 determines whether the SOC of the battery 15 is a preset specified second determination value $\alpha 2$ or higher. It should be noted that a higher value than the first determination value $\alpha 1$ is set as the second determination value $\alpha 2$. If it is determined that the SOC of the battery 15 is lower than the second determination value $\alpha 2$, the process returns to step S14. Then, the processes from steps S14 to S16 are repeatedly executed until it is determined that the SOC of the battery 15 is the second determination value $\alpha 2$ or higher, or until it is determined that the drive mode switching condition has not been established.

On the other hand, if it is determined that the SOC of the battery 15 is the second determination value $\alpha 2$ or higher, or it is determined in step S13 that the SOC of the battery 15 is higher than the first determination value $\alpha 1$, the process proceeds to step S17, and the vehicle control unit 30 executes the above-described assist control. In next step S18, the vehicle control unit 30 determines whether the drive mode switching condition has been established. If it is determined that the drive mode switching condition has not been established, the current control routine is terminated.

On the other hand, if it is determined that the drive mode switching condition has been established, the process proceeds to step S19, and the vehicle control unit 30 determines whether the SOC of the battery 15 is a preset specified third determination value $\alpha 3$ or lower. It should be noted that a lower value than the first determination value $\alpha 1$ is set as the third determination value $\alpha 3$. If it is determined that the SOC of the battery 15 is the third determination value $\alpha 3$ or lower, the process proceeds to step S14. On the other hand, if it is determined that the SOC of the battery 15 is higher than the third determination value $\alpha 3$, the process returns to step S17. Then, the processes from steps S17 to S19 are repeatedly executed until the SOC of the battery 15 becomes the third determination value $\alpha 3$ or lower, or until it is determined that the drive mode switching condition has not been established.

As it has been described so far, the drive system 10A of the first embodiment includes the lock mechanism 24 and the clutch mechanism 25. Thus, the three drive modes of the low gear mode, the high gear mode, and the continuously variable mode can be realized. In addition, the lock mechanism 24 and the clutch mechanism 25 are arranged on the opposite side of the engine 11 with the power split mechanism 20 and the first MG 12 being interposed therebetween. Thus, size increase of the lock mechanism 24 and the clutch mechanism 25 can be suppressed. Therefore, the drive system 10A can be downsized. In addition, mountability thereof in the vehicle 1 can thereby be improved.

Furthermore, the second MG 13 is arranged on the axis that differs from the axis on which the lock mechanism 24 and the clutch mechanism 25 are arranged. Thus, a length of the drive system 10A in a rotational axis direction can be reduced. Therefore, the drive system 10A can further be downsized.

This drive system 10A executes the charging control or the assist control when the drive mode switching condition is established. In the low gear mode and the high gear mode, a reactive force for transmitting the power of the engine 11 to the counter shaft 17 does not have to be output from the first MG 12. Thus, energy consumed by the first MG 12 can be reduced by executing the charging control or the assist control as described above. In addition, since the second MG 13 is controlled such that the operation point of the engine 11 is located on the optimal efficiency line L13, fuel economy can be improved. Therefore, energy efficiency of the drive system 10A can be improved.

It should be noted that the planetary gear unit 21 in this embodiment corresponds to the differential mechanism of the invention. The vehicle control unit 30 corresponds to the control means in the invention. The clutch mechanism 25 corresponds to the rotation limit means of the invention. The engaging state of the clutch mechanism 25 corresponds to a limiting state of the rotation limit means of the invention.

Second Embodiment

Figure 6:
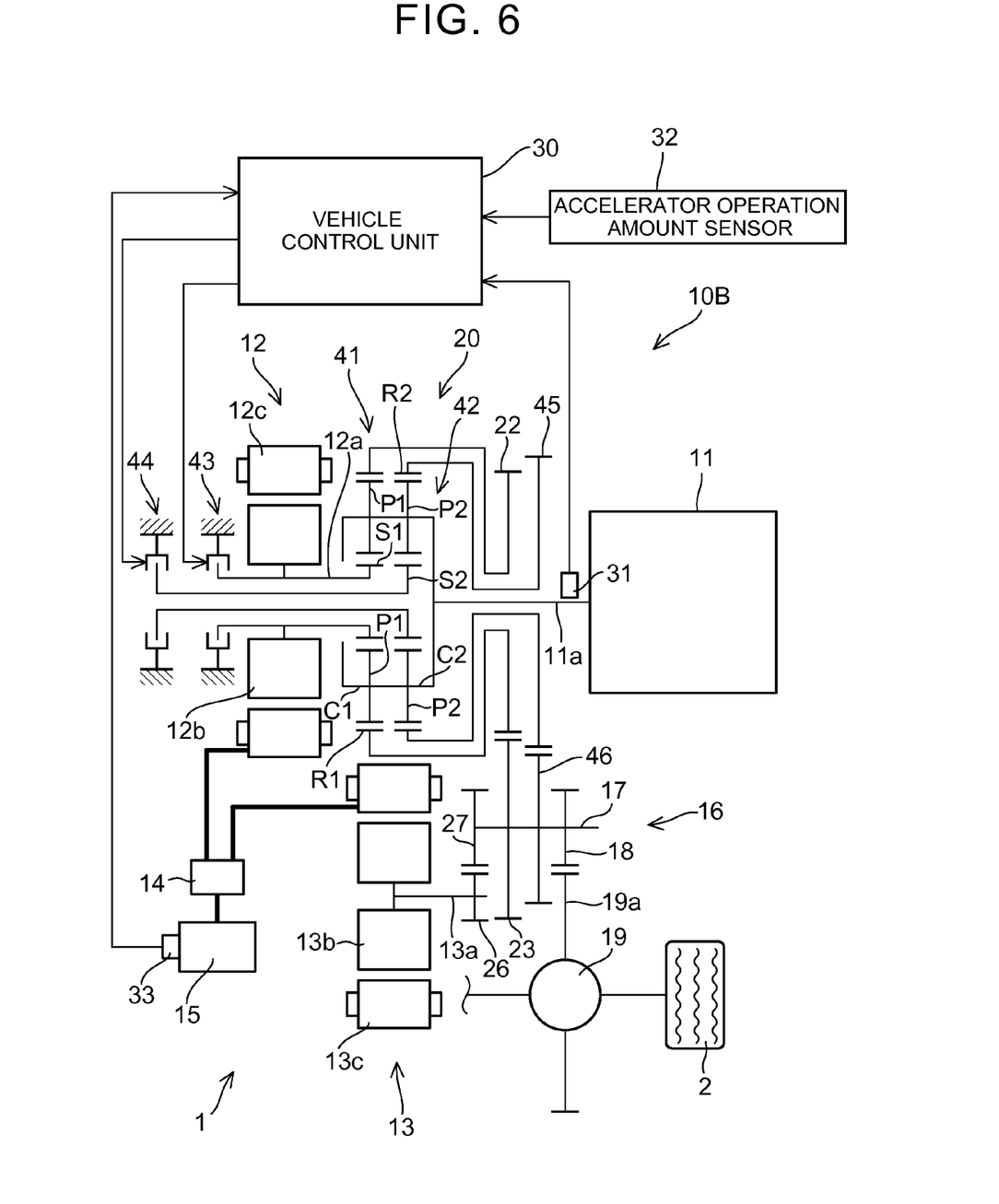
FIG. 6 schematically shows a drive system according to a second embodiment of the invention.

Next, a description will be made on a drive system according to a second embodiment of the invention with reference to FIG. 6 to FIG. 8. FIG. 6 is a skeletal view of a drive system 10B according to this embodiment. It should be noted that common components in this drawing with FIG. 1 are denoted by the same reference numerals and the description thereon will not be made.

In this embodiment, the power split mechanism 20 is provided with a first planetary gear unit 41 and a second planetary gear unit 42. These planetary gear units 41, 42 are each a planetary gear unit of the single pinion type. The first planetary gear unit 41 includes: a sun gear S1 as an outer gear; a ring gear R1 as an inner gear that is coaxially arranged with respect to the sun gear S1; and a carrier C1 for retaining a pinion gear P1 that meshes with these gears S1, R1 in a manner to allow rotation thereof and revolution thereof about the sun gear S1. Hereinafter, these sun gear S1, ring gear R1, carrier C1 of the first planetary gear unit 41 may respectively be referred to as the first sun gear S1, the first ring gear R1, and the first carrier C1. Similarly, the second planetary gear unit 42 also includes: a sun gear S2 as an outer gear; a ring gear R2 as an inner gear that is coaxially arranged with respect to the sun gear S2; and a carrier C2 for retaining a pinion gear P2 that meshes with these gears S2, R2 in a manner to allow rotation thereof and revolution thereof about the sun gear S2. Hereinafter, these sun gear S2, ring gear R2, carrier C2 of the second planetary gear unit 42 may respectively be referred to as the second sun gear S2, the second ring gear R2, and the second carrier C2. The first planetary gear unit 41 and the second planetary gear unit 42 are configured that transmission gear ratios among the sun gears, the carriers, and the ring gears are mutually the same.

As shown in this drawing, the first carrier C1 and the second carrier C2 are coupled so as to integrally rotate with the output shaft 11a of the engine 11. The first sun gear S1 is coupled to the rotor shaft 12a of the first MG 12. In addition, the first sun gear S1 is coupled to a first lock mechanism 43. The first lock mechanism 43 can be switched between a locking state in which the first sun gear S1 is unrotatably locked and a releasing state in which rotation of the first sun gear S1 is permitted. The second sun gear S2 is coupled to a second lock mechanism 44. The second lock mechanism 44 can be switched between a locking state in which the second sun gear S2 is unrotatably locked and a releasing state in which rotation of the second sun gear S2 is permitted.

As shown in this drawing, the engine 11, the first MG 12, the power split mechanism 20, the first lock mechanism 43, and the second lock mechanism 44 are arranged on the same axis. In addition, also in this embodiment, the power split mechanism 20 is arranged between the engine 11 and the first MG 12. The first lock mechanism 43 and the second lock mechanism 44 are arranged on an opposite side of the engine 11 with the power split mechanism 20 and the first MG 12 being interposed therebetween. Just as described, the first lock mechanism 43 and the second lock mechanism 44 are collectively arranged on one end.

The first ring gear R1 is coupled so as to integrally rotate with the first drive gear 22. The second ring gear R2 is coupled so as to integrally rotate with a third drive gear 45. The third drive gear 45 meshes with a third driven gear 46 that is provided on the counter shaft 17. A higher value than a gear ratio γ2 between the third drive gear 45 and the third driven gear 46 (hereinafter may be referred to as a second gear ratio) is set as a gear ratio γ1 between the first drive gear 22 and the first driven gear 23 (hereinafter may be referred to as a first gear ratio). That is, these gear ratios establish a relationship of γ1>γ2.

In this drive system 10B, the drive mode can be switched among the low gear mode, the high gear mode, and the continuously variable mode by switching a state of each of the first lock mechanism 43 and the second lock mechanism 44. In the low gear mode, the first lock mechanism 43 is switched to the locking state, and the second lock mechanism 44 is switched to the releasing state. In the high gear mode, the second lock mechanism 44 is switched to the locking state, and the first lock mechanism 43 is switched to the releasing state. In addition, the torque of the first MG 12 is set to zero. In the continuously variable mode, both of the first lock mechanism 43 and the second lock mechanism 44 are switched to the releasing state.

Figure 7:
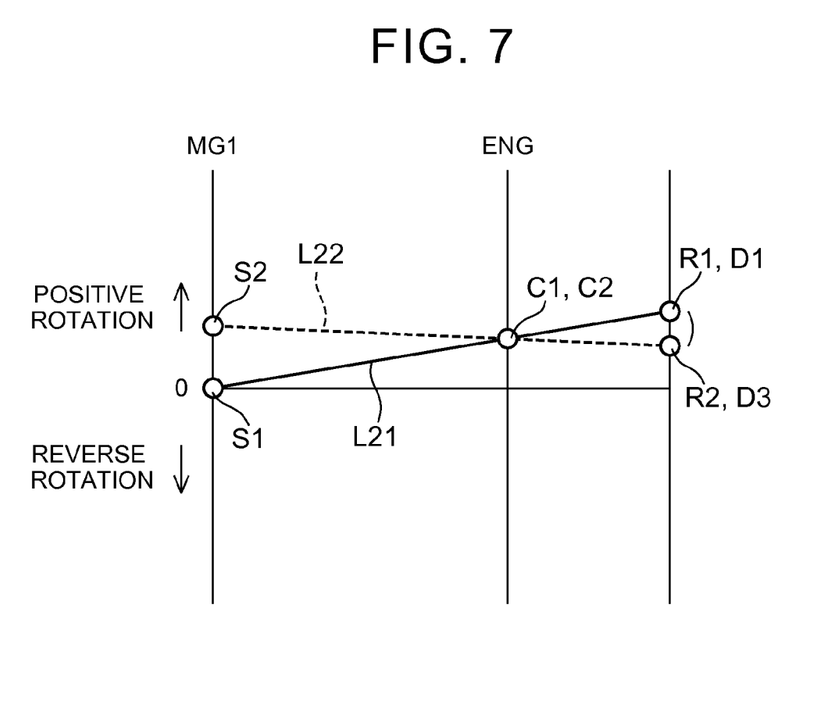
FIG. 7 shows one example of a collinear diagram of the drive system in the low gear mode.
Figure 8:
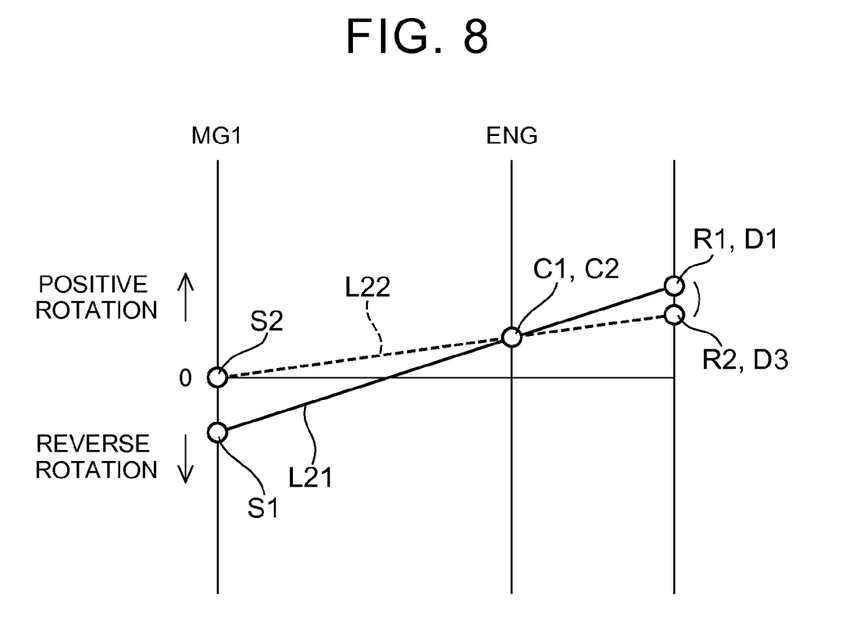
FIG. 8 shows one example of a collinear diagram of the drive system in the high gear mode.

FIG. 7 shows one example of a collinear diagram of the drive system 10B in the low gear mode. FIG. 8 shows one example of a collinear diagram of the drive system 10B in the high gear mode. It should be noted that, in the diagrams, "ENG" indicates the engine 11 and "MG1" indicates the first MG 12. In addition, "S1" indicates the first sun gear S1, "R1" indicates the first ring gear R1, and "C1" indicates the first carrier C1. "S2" indicates the second sun gear S2, "R2" indicates the second ring gear R2, and "C2" indicates the second carrier C2. "D1" indicates the first drive gear 22, and "D3" indicates the third drive gear 45. In the diagrams, a solid line L21 indicates relationships of rotation elements of the first planetary gear unit 41. A broken line L22 indicates relationships of rotation elements of the second planetary gear unit 42.

In the low gear mode, the first lock mechanism 43 is switched to the locking state. Thus, the first sun gear S1 is unrotatably locked. Meanwhile, since the second lock mechanism 44 is switched to the releasing state, the second sun gear S2 rotates idle. In this case, the rotation of the engine 11 is transmitted to the counter shaft 17 via the first planetary gear unit 41, the first drive gear 22, and the first driven gear 23.

In the high gear mode, the second lock mechanism 44 is switched to the locking state. Thus, the second sun gear S2 is unrotatably locked. Meanwhile, the first lock mechanism 43 is switched to the releasing state. In addition, the torque of the first MG 12 is set to zero. Thus, the first sun gear S1 and the rotor shaft 12a rotate idle. Accordingly, in this case, the rotation of the engine 11 is transmitted to the counter shaft 17 via the second planetary gear unit 42, the third drive gear 45, and the third driven gear 46. As described above, the second gear ratio $\gamma 2$ is smaller than the first gear ratio $\gamma 1$. Thus, when the speed of the engine 11 is the same, a rotational speed of the counter shaft 17 is higher in the high gear mode than in the low gear mode.

In the continuously variable mode, both of the first lock mechanism 43 and the second lock mechanism 44 are switched to the releasing state. Thus, in this case, the ratio between the speed of the engine 11 and the rotational speed of the first drive gear 22 can continuously be changed by changing the rotational speed of the first MG 12.

The first lock mechanism 43 and the second lock mechanism 44 are controlled by the vehicle control unit 30. Also in this embodiment, the vehicle control unit 30 executes the drive mode switching control routine in FIG. 4. In addition, the first lock mechanism 43 and the second lock mechanism 44 are controlled by executing this control routine. In other words, in the charging control, the first lock mechanism 43 and the second lock mechanism 44 are controlled such that the drive mode of the drive system 10B is shifted to the low gear mode. Meanwhile, in the assist control, the first lock mechanism 43 and the second lock mechanism 44 are controlled such that the drive mode of the drive system 10B is shifted to the high gear mode.

As it has been described so far, this drive system 10B includes the first lock mechanism 43 and the second lock mechanism 44. Thus, the three drive modes of the low gear mode, the high gear mode, and the continuously variable mode can be realized. In addition, these two lock mechanisms 43, 44 are arranged on the opposite side of the engine 11 with the power split mechanism 20 and the first MG 12 being interposed therebetween. Thus, size increase of the lock mechanisms 43, 44 can be suppressed. Therefore, the drive system 10B can be downsized, and mountability thereof in the vehicle 1 can thereby be improved.

Furthermore, also in this embodiment, the second MG 13 is arranged on the axis that differs from an axis on which the two lock mechanisms 43, 44 are arranged. Thus, a length of the drive system 10B in the rotational axis direction can be reduced.

Moreover, also in the drive system 10B, the charging control or the assist control is executed when the drive mode switching condition is established. Also in the low gear mode and the high gear mode of this embodiment, the reactive force for transmitting the power of the engine 11 to the counter shaft 17 does not have to be output from the first MG 12. Thus, the energy consumed by the first MG 12 can be reduced. In addition, since the second MG 13 is controlled such that the operation point of the engine 11 is located on the optimal efficiency line L13, the fuel economy can be improved. Therefore, energy efficiency of the drive system 10B can be improved.

It should be noted that the first planetary gear unit 41 and the second planetary gear unit 42 in this embodiment correspond to the differential mechanism of the invention. The first lock mechanism 43 corresponds to the lock mechanism of the invention. The second lock mechanism 44 corresponds to the rotation limit means of the invention. The locking state of the second lock mechanism 44 corresponds to the limiting state of the rotation limit means of the invention. The first drive gear 22 and the first driven gear 23 correspond to the gear line of the first gear ratio of the invention. The third drive gear 45 and the third driven gear 46 correspond to the gear line of the second gear ratio of the invention.

The invention is not limited to the above-described embodiments but can be implemented in various embodiments. For example, the planetary gear unit that is provided in the drive system of the invention is not limited to the planetary gear unit of the single pinion type. In the drive system of the invention, the planetary gear unit of a double pinion type may be used. However, in this case, connection destinations of the ring gear and the carrier in each of the embodiments are appropriately changed.

What is claimed is:

1. A drive system for a hybrid vehicle, the drive system comprising:
an internal combustion engine;
a first motor generator;
a power split mechanism that includes a differential mechanism having plural rotation elements capable of making mutually differential rotation, the internal combustion engine and the first motor generator are coupled to the power split mechanism;
an output member to which power output from the power split mechanism is transmitted;
a second motor generator that can output the power to the output member;
a lock mechanism that can be switched between a locking state in which a first rotation element coupled to the first motor generator among the plural rotation elements is unrotatably locked and a releasing state in which rotation of the first rotation element is permitted; and
a rotation limit mechanism that can be switched between a limiting state in which rotation of a second rotation element other than the first rotation element among the plural rotation elements is limited and a releasing state in which limit on rotation of the second rotation element is cancelled,
wherein
the internal combustion engine, the first motor generator, the power split mechanism, the lock mechanism, and the rotation limit mechanism are arranged on the same axis,
the power split mechanism is arranged between the internal combustion engine and the first motor generator, and
the lock mechanism and the rotation limit mechanism are arranged on an opposite side of the internal combustion engine with the power split mechanism and the first motor generator being interposed therebetween.

2. The drive system according to claim 1, wherein
the differential mechanism is a planetary gear unit of a single pinion type,
the plural rotation elements are a sun gear, a ring gear, and a carrier of the planetary gear unit,
the internal combustion engine is coupled to the ring gear,
the first motor generator is coupled to the sun gear,
the output member is connected to the carrier in a manner capable of transmitting the power, and the rotation limit mechanism couples the sun gear and the ring gear in a manner to allow integral rotation thereof in the limiting state, and cancels coupling of the sun gear and the ring gear in the releasing state.

3. The drive system according to claim 1, wherein
the differential mechanism is a first planetary gear unit and a second planetary gear unit of a single pinion type,
the plural rotation elements are a sun gear, a ring gear, and a carrier of the first planetary gear unit and also are a sun gear, a ring gear, and a carrier of the second planetary gear unit,
the internal combustion engine is coupled to the carrier of the first planetary gear unit and the carrier of second planetary gear unit,
the first motor generator is coupled to the sun gear of the first planetary gear unit,
the ring gear of the first planetary gear unit is connected to the output member in a manner capable of transmitting the power via a gear line of a first gear ratio,
the ring gear of the second planetary gear unit is connected to the output member in a manner capable of transmitting the power via a gear line of a second gear ratio that is smaller than the first gear ratio, and
the rotation limit mechanism unrotatably locks the sun gear of the second planetary gear unit in the limiting state, and permits rotation of the sun gear of the second planetary gear unit in the releasing state.

4. The drive system according to claim 1, wherein
the second motor generator is arranged on an axis that differs from an axis on which the lock mechanism and the rotation limit mechanism are arranged.

5. The drive system according to claim 1 further comprising:

a battery to which the first motor generator and the second motor generator are electrically connected; and a vehicle control unit, wherein the vehicle control unit is configured to switch the lock mechanism to the locking state, switch the rotation limit mechanism to the releasing state, and make the second motor generator generate electric power such that an operation point of the internal combustion engine is moved to a specified operation line defined such that thermal efficiency of the internal combustion engine is the maximum, in a case where a specified mode switching condition is established and a state of charge of the battery is lower than or equal to a specified determination value, and the vehicle control unit is configured to switch the lock mechanism to the releasing state, switch the rotation limit mechanism to the limiting state, and make the second motor generator output torque such that the operation point of the internal combustion engine is moved to the specified operation line defined such that the thermal efficiency of the internal combustion engine is the maximum, in a case where the specified mode switching condition is established and the state of charge of the battery is higher than the determination value.

* * * * *